Patented Oct. 21, 1952

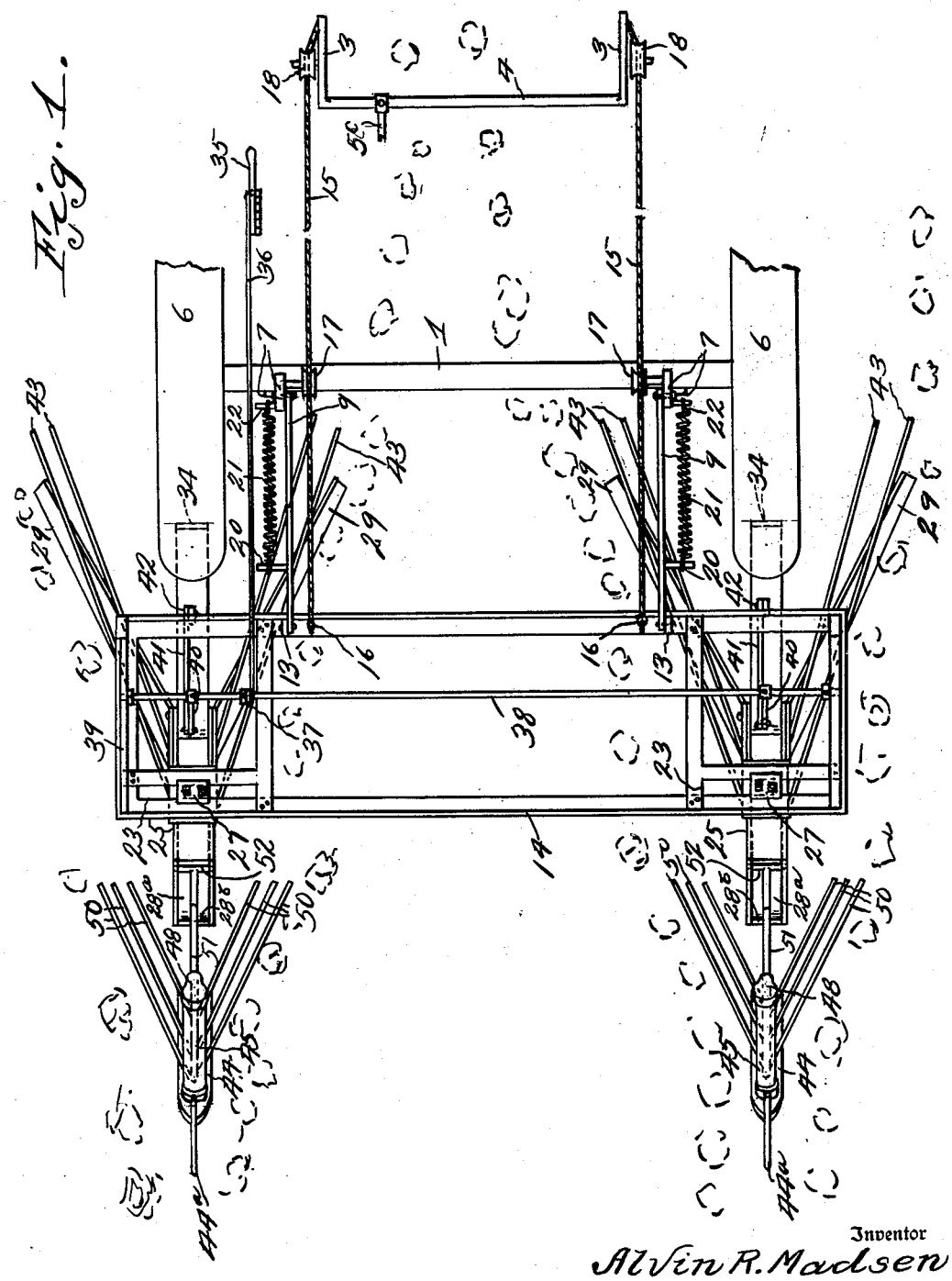

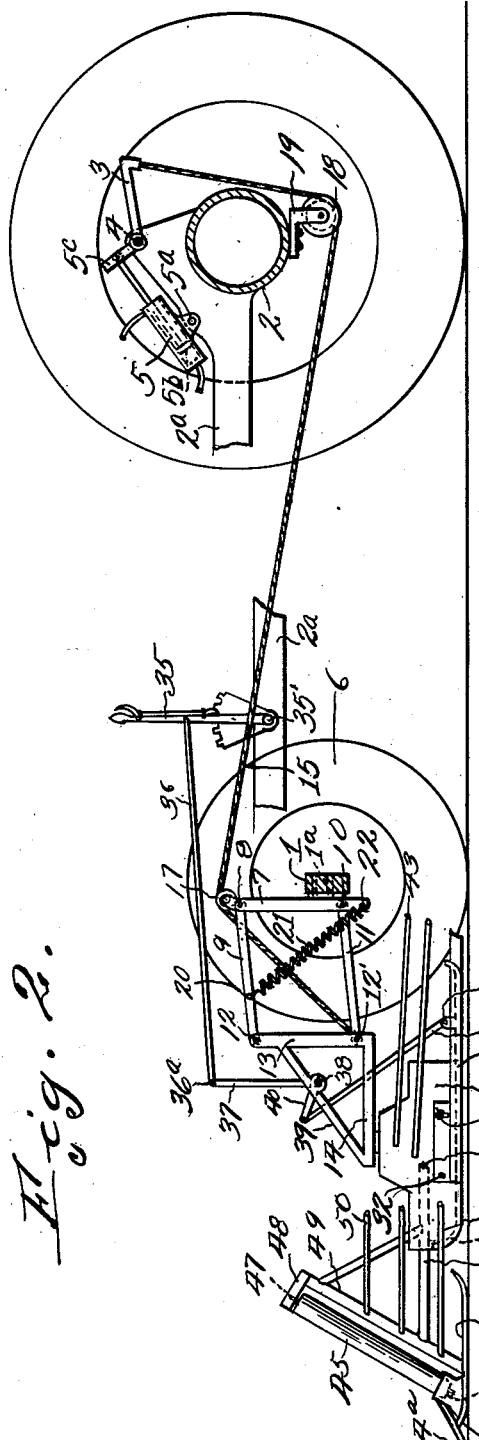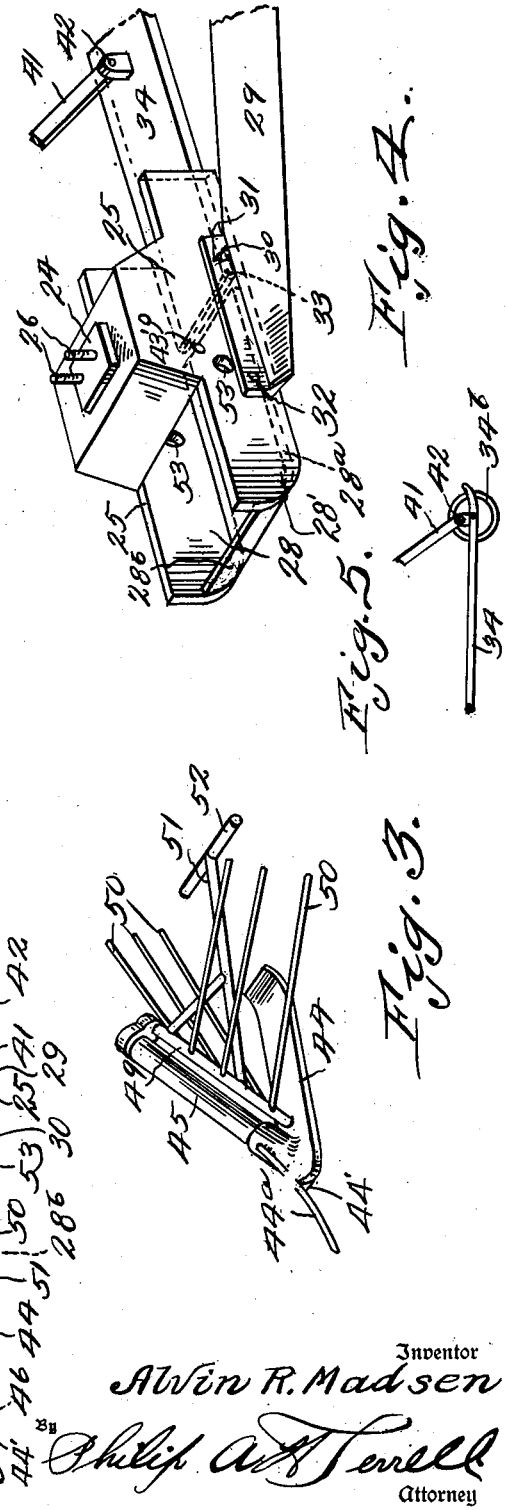

2,614,376

UNITED STATES PATENT OFFICE 2,614,376

BEAN AND PEA PLANT CUTTER

Alvin R. Madsen, Rupert, Idaho

Application August 19, 1949, Serial No. 111,249

3 Claims. (Cl. 55—64)

1

The invention relates to bean and pea plant cutters, and has for its object to provide a device of this kind attached to the front end of a tractor where it is pushed over the ground, rather than trailed, thereby obviating the mashing down of vines and the loss of peas, incident thereto, before the cutting operation.

A further object is to provide a bean and pea plant cutter which can be readily attached to the front end of a tractor and comprising ground engaging cutter-carrying skids at opposite sides of a vertically adjustable frame and diverging vine cutting blades carried by the skids and adapted to sever the plants below the surface of the ground. Also to provide in connection with the skids rearwardly diverging divider rods, which rods will push the plants outwardly as the cutter blades advance and will also laterally move the severed plants to a position where they will be deposited in windrows at opposite sides of the skids.

A further object is to provide a parallel linkage connection between the skids carrying frame and the front end of the tractor, so the shoes will remain in a horizontal position at any elevation.

A further object is to provide cable controlled means between the parallel linkage and the hydraulic controlled arms at the rear end of the tractor for elevating the skids and their carrying frame against the action of springs. The springs form means for urging the frame and shoes downwardly.

A further object is to provide divider members forwardly of the skids and supported on ground engaging shoes for dividing the plants in the rows, bending the plants outwardly to a position where they will be engaged by the diverging cutters on the skids. Also to provide the divider members with diverging divider rods for acting on the plants.

A further object is to provide a hinged connection between the divider members and the skids so said skids and divider members may move in a vertical plane relative to each other and means carried by the skids and cooperating with the divider members whereby the divider members will be elevated upon an upward elevation of the skids and frame on which the skids are mounted.

With the above and other objects in view the invention resides in the combination and arrangement of parts as hereinafter set forth, shown in the drawings, described and claimed, it being understood that changes in the precise embodiment of the invention may be made within the scope

2 of what is claimed without departing from the spirit of the invention.

In the drawings:

Figure 1 is a top plan view of the device, showing the device attached to the front end of a conventional form of tractor axle.

Figure 2 is a side elevation of the device, showing the tractor axles in cross section.

Figure 3 is a perspective view of one of the hingedly connected shoe supported divider members.

Figure 4 is a perspective view of one of the cutter carrying skids, with parts removed for the sake of clarity.

Figure 5 is a detail side elevation of a modified form of depth regulating means involving a wheel instead of a hinged blade as shown in Figures 1 and 2.

Referring to the drawings, the numeral 1 designates the front axle of a conventional form of tractor and 2 the rear axle housing. Disposed above the rear axle housing 2 are hydraulically controlled arms 3 on a rock shaft 4 carried by the tractor frame 2a. Arms 3 are controlled by a hydraulic cylinder 5 hingedly mounted at 5a on the tractor frame 2a, parts only of which frame are shown. The arms 3 and hydraulic control 5 are standard equipment with tractors as at present constructed. Piston 5b is reciprocated in the cylinder 5 in the usual manner and has its piston rod pivoted to the arm 5c carried by the rock shaft 4. Hydraulic control 5 is of the Ferguson type, an example of which is shown in patent to Le Bleu, #1,891,428, issued December 20, 1932.

Secured to the forward side of the axle 1, adjacent the wheels 6, are vertical bars 7. Bars 7 have their upper ends pivoted at 8 to forwardly extending links 9, and pivoted at 10 to the lower ends of the bars 7 are forwardly extending links 11. The forward ends of links 9 and 11 are pivotally connected at 12 and 12' to the side vertical arms 13, which arms 13 are carried by the ends of the horizontally disposed rectangularly shaped frame 14. By providing a parallel linkage as shown, between the vertical bars 7 and the vertical arms 13 carried by the frame 14, it will be seen that when the linkage is raised or lowered through the medium of the cables 15, the frame 14 will always be in a horizontal plane. The forward ends of the cables 15 are anchored at 16 to the frame 14, and the cables lead upwardly and rearwardly over sheaves 17 carried by the upper ends of the rigidly mounted bars 7. Cables 15 extend rearwardly and downwardly under the rear axle housing 2 and under pulleys 18 carried by brackets 19 secured to the under side of the rear axle housing 2. The cables extend upwardly and are anchored to the hydraulically controlled arms 3. Secured to the links 9, at 20, are coiled springs 21, the other ends of which are anchored at 22 to the lower ends of the vertical bars 7. Springs 21 normally urge the parallel connection and frame 14 downwardly against the action of the hydraulic control, therefore it will be seen that a yieldable structure is provided, and one wherein the frame 14 is always under a downward pressure.

The rectangular frame 14, at opposite sides thereof, is provided with transversely disposed slots 23, in which slots the rectangular portions 24 of the cutter carrying skids 25 are slidably adjustable. The skids are adjusted transversely by loosening and tightening the nuts on the bolts 26, which bolts extend upwardly through clamping plates 27. The cutter carrying skids are transversely adjusted for width of rows, as shown in Figure 1. Skids 25 are formed from spaced members 28 and 28', to the outer sides of which are secured as at 30 rearwardly diverging cutter bars 29, which cutter bars are adjusted to enter the ground about one half inch below the surface to get the best result. The inclination of the cutter bars may be varied by loosening the bolts 30 which extend through arcuate slots 31 in the cutter bar flanges, thereby allowing the pivotal adjustment of the cutter bars on the pivot points 32. Pivoted between the spaced members 28 on each skid, at 33, are rearwardly extending depth regulating blades 34, which blades 34 are raised or lowered by a hand lever 35 pivoted to the tractor frame 2a at 35'. The hand lever has connected thereto a forwardly extending connecting rod 36, the forward end of which is pivotally connected at 36a to an upwardly extending arm 37 carried by a transverse rock shaft 38. Rock shaft 38 has its ends rockably mounted in bearings of bars 39 forming the ends of the frame 14. Rock shaft 38, above the cutter skids, is provided with arms 40 to the ends of which are connected downwardly and rearwardly extending links 41, which links are pivotally connected at 42 to the members 34, therefore it will be seen that the depth of cut may be regulated as desired, that is the distance below the surface of the ground. It has been found that the best cutting depth is one half inch for peas and beans. If the cut is too deep the plants will have small roots thereon which will cause trouble when run through a combine. Extending outwardly and rearwardly from the cutter bar skids 25 are divider rods 43, which rods push the severed plants outwardly, as shown in Figure 1, and into windrows for further handling. Rods 43 are anchored in apertures 43' in spaced members 28 and 28' of the skids 25.

The forward ends of the skids 25 are closed by plates 28a connecting the members 28 and 28', and which plates have their forward ends upwardly curved at 28b, so the skids will easily slide over the ground. The curved portions 28b have an additional function which will presently appear.

Disposed forwardly of each skid 25 is a divider shoe 44, which shoe slides over the ground, and along with the divider finger 44a mounted thereon, divides the row of plants, so the plants will fall or be forced to both sides of the shoe. The shoe 44 is curved at its forward end 44' to prevent packing of the earth or digging into the ground as the machine advances. Extending upwardly and rearwardly from the forward end of each shoe 44 is a roller 45, which roller facilitates the dividing of the plants. The lower end of said roller 45 is rotatably mounted in a bearing 46 of the shoe, and the upper end of the roller has a bearing 47 in an arm 48 carried by a brace rod 49. The brace rod 49 provides a rigid connection between the shoe 44 and the roller 45. Brace rod 49 is provided with rearwardly diverging divider fingers 50 which bend the plants outwardly so the following skid with the cutters can sever the plants. Extending rearwardly from each brace rod 49 is a triangularly shaped frame 51, which frame has its rear end provided with a transverse shaft 52 having bearings in the side members 28 and 28' of the skids as shown at 53. It will be seen that the divider shoes and their parts can move in vertical longitudinal planes as the shoes 44 follow the contour of the ground.

When the frame 14 is elevated the upper edge of the curved portion 28b of the plate 28a engages the under side of the member 51, consequently the divider is elevated therewith, thereby allowing the mechanism to be raised from the ground when the device is transported from place to place for use.

Referring to Figure 5 wherein a modified form of support means is used for quickly regulating the depth of the cutters, which takes place from time to time, according to the contour of the ground, the operation is the same, however the hinged plate 34 is provided with a ground engaging wheel 34b. In some cases it is desired to use a wheel instead of a sliding plate.

From the above it will be seen that by mounting the device on the front of the tractor and the dividers and skids in alinement with the tractor wheels, the vines or plants are severed ahead of the wheels and deposited in rows where the tractor wheels will not pass over the plants, hence there is a minimum amount of loss during the shelling and threshing operation. Where devices of this general character are trailed by the tractor, the tractor wheels thresh out a great amount of the beans and peas incident to the wheel hitting them. It will also be seen that the dividers on the front of the device leave a clear track for the skids 25 to follow as the beans or peas are all pushed aside. It will also be seen that the device can be easily and quickly attached to a conventional form of tractor without modifying the construction of the tractor, and that the device is a pusher rather than a puller type.

The invention having been set forth what is claimed as new and useful is:

1. A machine for severing plants in rows, a tractor having a front axle to which said machine is attached, said machine being entirely located forwardly of the tractor, said machine comprising a transversely disposed horizontal frame, forward of the tractor, ground engaging skids carried by said frame forwardly of said tractor, diverging cutter bars carried by said skids and a parallel link connection between said frame and said axle and forming means whereby said skids are maintained in a horizontal position upon upward and downward movement of the frame, means for raising and lowering said frame horizontally hinged depth regulating plates carried by the skids and lever control means for pivotally adjusting said plates.

2. A machine for severing plants in rows, a tractor having a front axle to which said machine is attached, said machine being entirely located forwardly of the tractor, said machine comprising a transversely disposed horizontal frame forward of the tractor, ground engaging skids carried by said frame forwardly of said tractor, diverging cutter bars carried by said skids and a parallel link connection between said frame and said axle and forming means whereby said skids are maintained in a horizontal position upon upward and downward movement of the frame, means for raising and lowering said frame, plant divider members forwardly of the cutter skids, said plant divider members comprising ground engaging shoes, upwardly and rearwardly extending rotatable rollers, said rollers being carried by rearwardly extending frames, the rear ends of said frames being pivotally connected to the cutter carrying skids and movable in a vertical longitudinal plane.

3. A machine for severing plants in rows, a tractor having a front axle to which said machine is attached, said machine being entirely located forwardly of the tractor, said machine comprising a transversely disposed horizontal frame forward of the tractor, ground engaging skids carried by said frame forwardly of said tractor, diverging cutter bars carried by said skids and a parallel link connection between said frame and said axle and forming means whereby said skids are maintained in a horizontal position upon upward and downward movement of the frame, means for raising and lowering said frame, plant divider members forwardly of the cutter skids, said divider members comprising frames hingedly connected to the forward ends of the cutter skids for movement in vertical longitudinal planes, ground engaging shoes carried by the divider members, upwardly and rearwardly extending rollers carried by the divider members and rearwardly diverging divider arms carried by the frames.

ALVIN R. MADSEN.

REFERENCES CITED

The following references are of record in the file of this patent:

UNITED STATES PATENTS

| Number | Name | Date |
|---|---|---|
| 1,893,863 | Kerns | Jan. 10, 1933 |
| 1,971,495 | McGee et al. | Aug. 28, 1934 |
| 2,305,254 | Hirschkorn | Dec. 15, 1942 |
| 2,466,555 | Paine et al. | Apr. 5, 1949 |